United States Patent
Wheat et al.

(10) Patent No.: US 9,533,832 B1
(45) Date of Patent: Jan. 3, 2017

(54) BELT MISALIGNMENT SENSING AND SENSOR STATUS SENSING APPARATUS AND METHOD OF USE

(71) Applicants: Norman Victor Wheat, Harrogate (GB); Jonathan Norman Wheat, Peoria, IL (US)

(72) Inventors: Norman Victor Wheat, Harrogate (GB); Jonathan Norman Wheat, Peoria, IL (US)

(*) Notice: Subject to any disclaimer, the term of this patent is extended or adjusted under 35 U.S.C. 154(b) by 0 days.

(21) Appl. No.: 14/736,862

(22) Filed: Jun. 11, 2015

(51) Int. Cl.
*B65G 43/00* (2006.01)
*B65G 43/04* (2006.01)
*B65G 39/16* (2006.01)
*B65G 43/02* (2006.01)

(52) U.S. Cl.
CPC .......... *B65G 43/04* (2013.01); *B65G 39/16* (2013.01); *B65G 43/02* (2013.01)

(58) Field of Classification Search
CPC .... B65G 39/16; B65G 43/02; B65G 2203/042
See application file for complete search history.

(56) References Cited

U.S. PATENT DOCUMENTS 6,237,752 B1 * 5/2001 El-Ibiary ............... B65G 39/16
198/810.03

* cited by examiner

*Primary Examiner* — Hongmin Fan
(74) *Attorney, Agent, or Firm* — Kajane McManus

(57) ABSTRACT

A misaligned belt sensing apparatus determines when a conveyor belt becomes misaligned, indicating repair or replacement are required. At least one sensing apparatus is placed nearly in contact with the belt which produces heat due to friction between the belt and the apparatus when it comes in contact with same due to misalignment. The sensed temperature is compared to threshold values and indicates when the conveyor belt has become misaligned, as well as determining operational wear status of the sensing apparatus after a number of such misalignments. Each heat sensing apparatus comprises at least one thermally conductive plate where a moving misaligned belt rubs against the thermally conductive plate and generates heat due to friction between the moving belt and the thermally conductive plate, where each plate has one or more independent temperature sensing elements for misalignment detection and indication, also detecting wear status of the plates of the apparatus.

19 Claims, 4 Drawing Sheets

FIG. 9
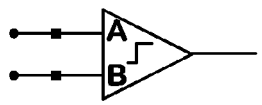
FIG. 10 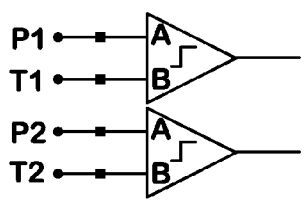 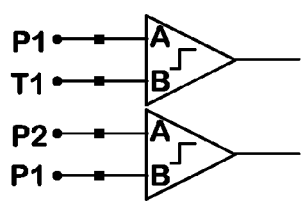 FIG. 11

FIG. 18

BELT MISALIGNMENT SENSING AND SENSOR STATUS SENSING APPARATUS AND METHOD OF USE

I. BACKGROUND OF THE INVENTION

The use of thermally conductive plates with embedded temperature sensing devices is well known as an apparatus for detecting misalignment of any moving belt such as a conveyor belt and transmitting an electrical signal or other indication to a remote location, to allow the misalignment to be corrected or the conveyor shut down before the heat buildup of the conveyor belt or parts of the machine against which the misaligned belt may rub reaches a dangerous level. These detection devices are often referred to as rub blocks. The action of the belt rubbing against the rub blocks also causes wear of their thermally conductive plates. If such wear goes undetected, the belt can rub completely through one or both plates, rendering the apparatus inoperative or it could cause the temperature sensing element of the rub blocks to fail, again rendering the apparatus inoperative, and further or continued misalignment of the conveyor belt could go undetected.

To ensure that the detection apparatus is still working correctly, it is necessary for frequent visual inspections to be made to ensure that the apparatus has not been excessively worn. In environments where the apparatus is mounted on an enclosed conveyor or belt or bucket elevator or similar machines, it is not possible to make a visual inspection of the apparatus without removing it from the machine casing. Alternatively, the apparatus has to be mounted on a hinged door so that it may be accessed for inspection. No matter how frequent such inspections may be, they are not continuous and therefore it is likely that an undesirable condition will be undetected for some time.

These inspections would normally necessitate frequent machine shutdown for safety reasons and are costly and frequently omitted. If there is enough space available on the machine, it is possible to use more than one rub block apparatus mounted adjacently, with one apparatus protruding into the machine casing more than the second apparatus. In this way, the theory is that the apparatus which protrudes the most would become worn first and subsequent rubbing on the second apparatus would indicate that the first apparatus has worn excessively and needs replacement. However this arrangement is not normal practice due to the additional cost of installation of the additional apparatus, the cost of the additional apparatus, the additional space needed for the additional apparatus, and the fact that wear at the location of the additional apparatus is not the same wear at the location of the initial apparatus even when the apparatuses are placed within close proximity to each other.

This apparatus of the present invention provides for two levels of rub detection within a single apparatus such that only one device need be fitted. The invention is able to provide two signals or one combined signal of both rub conditions and wear conditions. The signals can be processed to provide either two levels of alarm or one level of alarm followed by an automatic stopping signal for the machine. This invention therefore provides increased effectivity and cost savings by eliminating extraneous cost of a required second adjacent apparatus and without the cost of frequent inspections or hinged doors for inspection.

II. SUMMARY OF THE INVENTION

According to the invention there is provided a belt misalignment sensing and sensor status sensing apparatus comprising at least two thermally conductive plates where a misaligned moving conveyor belt first rubs against a first thermally conductive plate which generates heat due to friction between the moving conveyor belt and thermally conductive plate, and, in certain circumstances, rubs against a second thermally conductive plate indicating potential first plate failure and where each thermally conductive plate has one or more independent temperature sensing elements not only enabling the belt misalignment to be detected but detection of the wear status of the apparatus as well.

III. BRIEF DESCRIPTION OF THE DRAWINGS

FIG. 9 shows a generalized schematic of a prior art comparator circuit incorporating the apparatus 10.

FIG. 10 shows a prior art application circuit comprised of two comparators in conjunction with use of the apparatus 10.

FIG. 11 shows a further prior art application circuit comprised of two comparators in conjunction with use of the apparatus 10.

FIG. 13 shows yet a further circuit comprised of two comparators in conjunction with use of the apparatus 10.

FIG. 18 shows that two separate sensors comprising apparatus 10 can be connected to a control system or comparator system using two wires or three wires with the sensors connected in series with one of the sensors having a changeover.

IV. DETAILED DESCRIPTION OF THE PREFERRED EMBODIMENT(S)

It will first be understood that the apparatus 10 of the present invention may be constructed using any of the mechanical construction and fastening techniques generally known by those skilled in the art. Therefore the structures described in this disclosure should be construed as exemplary and not limiting to the scope of the invention.

Figure 1:
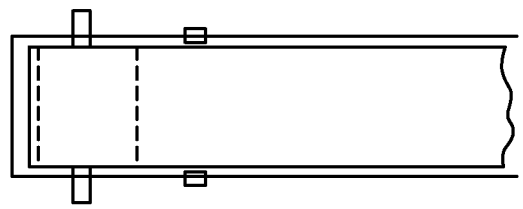
FIG. 1 shows a prior art top plan view of a conveyor with moving belt with a pair of conventional rub block sensors mounted opposite each other, with the belt in a non-misaligned condition.

FIG. 1 shows a prior art top plan view of a conveyor with moving belt with a pair of conventional rub block sensors mounted opposite each other, with the belt in a non-misaligned condition.

Figure 2:
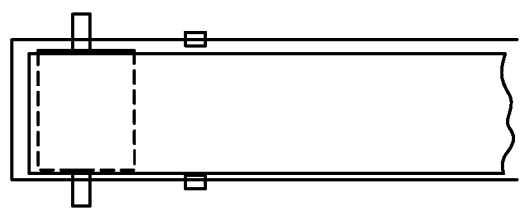
FIG. 2 shows a prior art top plan view of a conveyor with moving belt and with a pair of conventional rub block sensors mounted opposite each other, with the belt in a misaligned condition.

FIG. 2 shows a prior art top plan view of a conveyor with moving belt and with a pair of conventional rub block sensors mounted opposite each other, with the belt in a misaligned condition.

Figure 3:
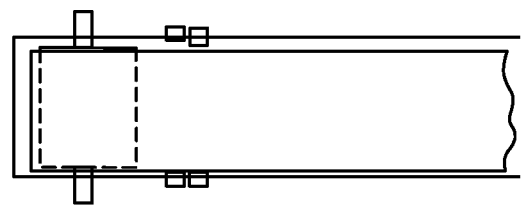
FIG. 3 shows a prior art top plan view of a conveyor with moving belt and with two pairs of conventional rub block sensors mounted opposite each other, with the belt in a misaligned condition and with one of the sensors worn to destruction.

FIG. 3 shows a prior art top plan view of a conveyor with moving belt with two pairs of conventional rub block sensors mounted opposite each other, with the belt in a misaligned condition and with one of the sensors worn to destruction, with the sensors being staggered in position relative to the run of the belt, one being spaced closer and one being spaced further away from the end edge of the belt.

Figure 4:
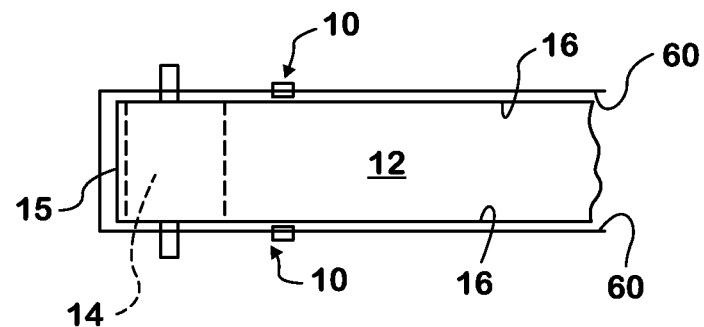
FIG. 4 shows a top plan view of a conveyor with moving belt and with a pair of rub block sensors of the present invention mounted opposite each other, with the belt in a non-misaligned condition.

FIG. 4 shows top plan view of the apparatus or rub block sensors 10 of the present invention, used in pairs, with one to either side of a moving conveyor belt 12 which travels around a drum 14 at each end 15 (one shown) of the belt 12. The apparatus 10 is shown slightly spaced from each side edge 16 of the belt 12 when the belt 12 is in normal aligned flight about the drum 14.

Figure 5:
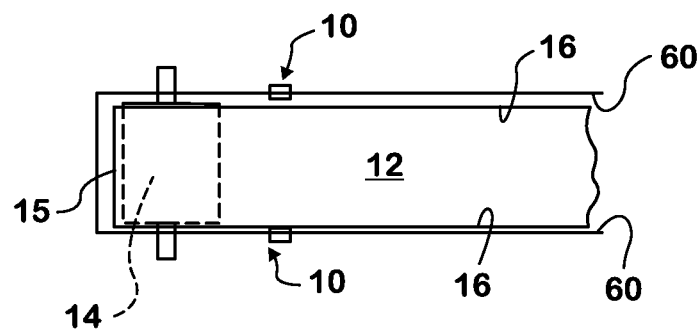
FIG. 5 shows a top plan view of a conveyor with moving belt and with a pair of rub block sensors of the present invention mounted opposite each other, with the belt in a misaligned condition and in contact with a first forward contact portion of one sensor.

FIG. 5 shows a top plan view similar to that of FIG. 4 except that here the belt 12 is slightly out of alignment and is in contact with a first forward contact portion 20 (FIGS. 7B and 8B) of one rub block sensor or apparatus 10 along one side edge 16 thereof.

Figure 6:
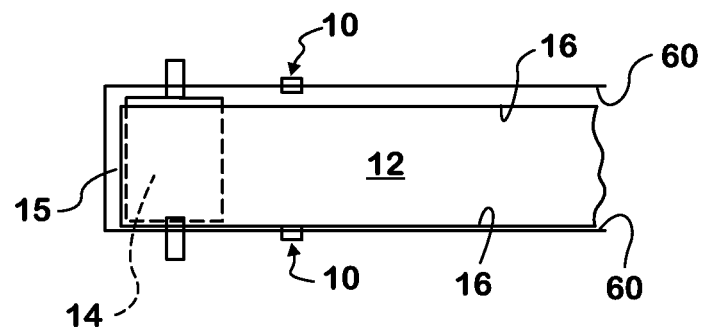
FIG. 6 shows a top plan view of a conveyor with moving belt and with a pair of rub block sensors of the present invention mounted opposite each other, with the belt in a misaligned condition and with the first forward contact portion of one sensor worn through, the belt now contacting a second rearward contact portion of the sensor.

FIG. 6 shows a top plan view similar to that of FIG. 5 except that here the belt 12 is out of alignment to a greater degree and is shown to have worn through the first forward contact portion 20 and is now in contact with a second rear contact portion 22 of one rub block sensor or apparatus 10 along one side edge 16 thereof.

FIGS. 4 through 6 show the apparatus 10 of the present invention generally, in use in detecting misalignment and the degree thereof of the belt 12. Further, the FIGS. show how the apparatus 10 accommodates for failure of the first forward contact portion 20 by providing the second rear contact portion 22, these contact portions to be defined with reference to FIGS. 7A-7C and 8A-8C hereinbelow.

Figures 7A, 7B, 7C:
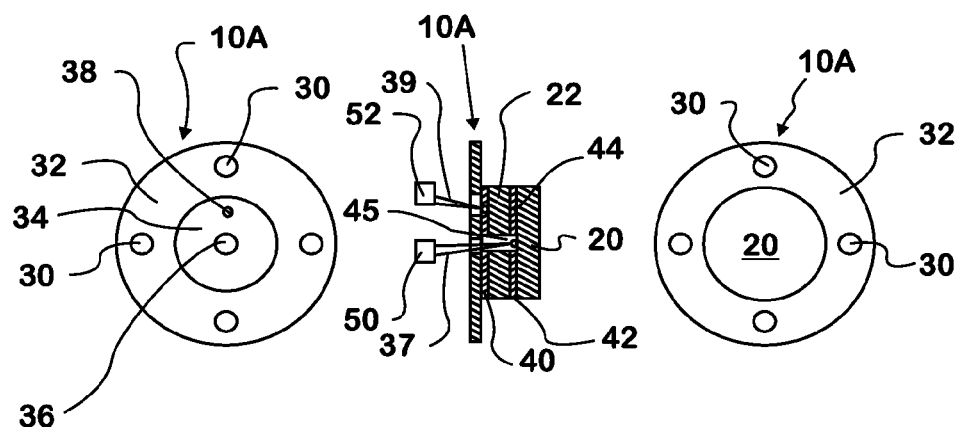
FIG. 7A-7C show a rear, side and front views, respectively, of one exemplary embodiment of the apparatus showing its construction and means for obtaining separate signals of rub and of wear.

Turning now to FIGS. 7A-7C, there is provided a first exemplary embodiment 10A of the apparatus 10 wherein the apparatus 10A has a round configuration when viewed from the back, as in FIG. 7A and from the front, as in FIG. 7C.

In both of these views it will be seen that there are mounting holes 30 provided in a mounting plate or rim section 32 of the apparatus 10A for use in suitably mounting same to suitable mounting structures, as is known in the art. When viewed from the front as in FIG. 7C, the only other item visible is the first forward contact portion 20, shown here centered within the rim section 32. When viewed from the back, as in FIG. 7A, the mounting holes 30 in the rim section 32 are also visible and there are two further openings provided in a body area 34 surrounded by the rim section 32. One of these openings 36 is provided for passage therethrough of wiring section 37 (FIG. 7B) connected to the first forward contact portion 20 and another of these openings 38 is provided for passage therethrough of wiring section 39 (FIG. 7B) connected to the second rear contact portion 22. In the preferred embodiment contact portions 20 and 22 take the form of thermally conductive plates with the rear one 22 being attached to the mounting plate 32 and is thermally insulated from the mounting plate 32 by a layer of insulating material 40 placed therebetween. The first forward contact portion 20 is attached to a front surface 44 of second rear contact portion 22 and is thermally isolated from the second rear contact portion 22 by a layer of thermally insulating material 42 placed therebetween. It will further be understood that a small opening 45 is provided through the layer of insulating material 40 between the contact portions 20 and 22 as well as through the second rear contact portion 22 through which the wiring section 37 passes in an insulated manner before exiting opening 36. A temperature sensor 50 is attached to the first forward contact portion 20 and provides a signal of its temperature. Likewise, a temperature sensor 52 is attached to second rear contact portion 22 to provide a signal of its temperature. Any type of temperature sensor may be used to give the appropriate signals and there may even be different types of sensors used with each contact portion 20, 22. Wiring sections 37 and 39 are provided, respectively, for contact portions 20 and 22 for providing connections to these contact portion 20, 22 to allow signals from each to be separated or combined and for further conducting these signals to alarm and control equipment (not shown), if desired.

The apparatus 10 may be attached to any suitable portion of a conveyor framework 60 in any suitable manner, with the apparatus 10 being so positioned that it is:

A. not contacted by the moving belt 12 when there is no misalignment;
B. has first forward contact portion 20 contacted by the belt when there is misalignment, before the belt 12 can contact conveyor framework 60;
C. has second rear contact portion 22 contacted by the belt 12 if first forward contact portion 20 is severely worn and may be rendered nonfunctional by the wear but before the belt 12 can contact conveyor framework 60.

Figures 8A, 8B, 8C:
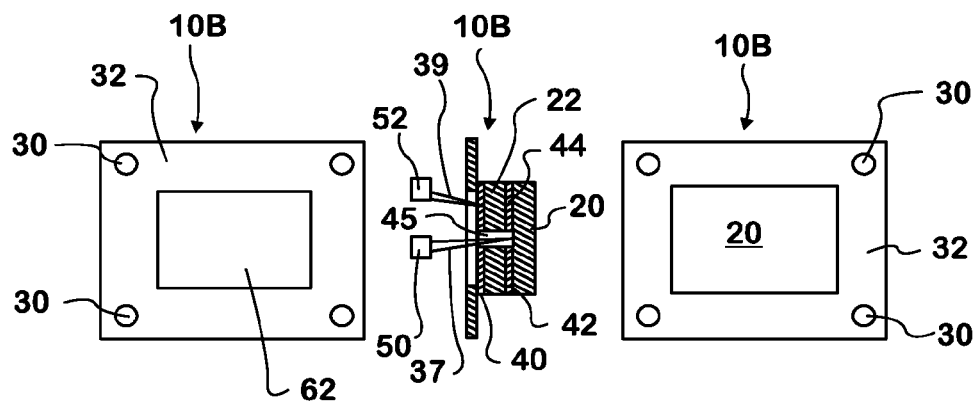
FIG. 8A-8C show a rear, side and front views, respectively, of another exemplary embodiment of the apparatus in an alternative shape showing its construction and means for obtaining separate signals of rub and of wear.

The apparatus 10 may have any desired dimensions, being large or small to suit the environment of use. The apparatus 10 may also be made with contact portions 20, 22 in any shape or of any suitable thermal material to suit the belt 12 and the wear characteristics of the belt 12. Also, as shown in FIGS. 8A-8C the device 10B can be of any configuration, such as square rather than round, as shown, and the mounting plate 32 may be configured to have a single larger opening 62 therein which is of dimensions smaller than those of the second rear contact portion 22. Thus modifications may be proposed without departing from the teachings of the invention.

It will also be understood that the apparatus 10 provides ambient temperature compensation as well. In this respect, the two temperature sensors 50, 52 will indicate the temperature of the two thermal plates 20, 22, respectively, at all times. When the belt 14 is not rubbing on either plate 20 or 22, they will both indicate substantially the same temperature which will be the ambient temperature of the apparatus 10. For example, this ambient temperature could be as low as −40 degrees F. in winter and as high as +100 degrees F. in summer. Without such ambient temperature compensation, a comparator can only determine that there is rub or wear if the temperature is measured as higher than 100 degrees F.; otherwise a false alarm would be triggered due to the high ambient temperatures of summer. With ambient temperature compensation, the difference between the two sensed temperatures is measured so any small increase in the temperature sensed at the first forward contact portion 20 can be detected. For example, if it indicates 110 degrees F. (ambient plus rub) and the temperature sensed at the second rearward contact portion 22 indicates 100 degrees F. (ambient), an alarm would be generated to indicate rub. This 10 degree difference would hold true over the entire range of ambient temperatures. If the temperature sensed at the second rearward contact portion 22 indicates 110 degrees F. and the temperature sensed at the first forward contact portion 20 indicates 100 degrees F., an alarm could be generated to indicate wear and again this 10 degree difference would hold true over the entire range of ambient temperatures.

By measuring the difference between the sensed temperatures, the apparatus 10 automatically compensates for any ambient temperature variation and can make the detection of rub or wear much more sensitive.

The apparatus 10 can be made with sensors 50, 52 connected independently, or together in series or in parallel or with a changeover connection such that the two conditions of rub and wear can be separately detected as known to those skilled in the art and as will be modestly described in connection with FIGS. 9-18 for clarity.

It will be understood that FIGS. 9-18 all show prior art circuitry which can be accommodated by the apparatus 10 of the present invention, showing its versatility and universality. These representations should not be construed as at all limiting, since they present circuitry features known by those skilled in the art.

FIG. 9 shows a generalized schematic of a prior art comparator circuit which can be realized either in electronic circuitry, in microprocessor language or in plc language or in computer language. Signals of sensed P1 and predetermined threshold T1 values, here from first forward contact portion 20, are inputted to the comparator at A and B, respectively. If the signal at A is greater than the signal at B then the output of the comparator turns ON or goes to logical high or TRUE. If the signal at A is less than the signal at B then the output of the comparator turns OFF or goes to logical low or FALSE. Generally, hysteresis is applied to the circuit to prevent 'chattering' when the signals at A and at B are very close to each other in magnitude. These comparator circuits can be used to determine the status of signals as in FIG. 10 through 13.

FIG. 10 shows the application of two comparators. The upper comparator compares the signal P1 to a predetermined value T1 and turns ON when P1 exceeds T1. The lower comparator compares the sensed signal P2 from the second rearward contact portion to its predetermined threshold value T2 and turns ON when P2 exceeds T2.

FIG. 11 shows the application of two comparators. The upper comparator compares the signal P1 to the value T1 and turns ON when P1 exceeds T1. The lower comparator compares the signal P2 to the signal P1 and turns ON when P2 exceeds P1 to indicate failure of first forward contact portion 20 of the apparatus 10.

Figure 12:
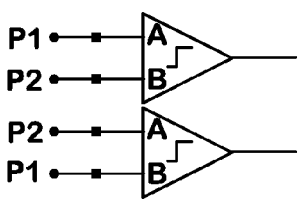
FIG. 12 shows yet a further prior art application circuit comprised of two comparators in conjunction with use of the apparatus 10.

FIG. 12 shows the application of two comparators. The upper comparator compares the signal P1 to the signal P2 and turns ON when P1 exceeds P2 indicating belt misalignment. The lower comparator compares the signal P2 to the signal P1 and turns ON when P2 exceeds P1 indicating apparatus 10 wear.

FIG. 13 shows the application of two comparators. The upper comparator compares the signal P1 to the signal P2 and turns ON when P1 exceeds P2. The lower comparator compares the signal P2 to a predetermined threshold value T2 and turns ON when P2 exceeds T2 indicating apparatus wear.

Figure 14:
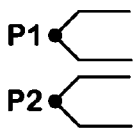
FIG. 14 shows that two separate sensors comprising apparatus 10 can be connected to a control system or comparator system using four wires.

FIG. 14 shows that two separate sensors cooperating with the apparatus 10 can be connected to a control system or comparator system using four wires.

Figure 15:
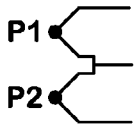
FIG. 15 shows that two separate sensors comprising apparatus 10 can be connected to a control system or comparator system using three wires.

FIG. 15 shows that two separate sensors can be connected to a control system or comparator system using three wires.

Figure 16:
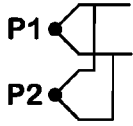
FIG. 16 shows that two separate sensors comprising apparatus 10 can be connected to a control system or comparator system using two wires with the sensors connected in parallel.

FIG. 16 shows that two separate sensors can be connected to a control system or comparator system using two wires with the sensors connected in parallel. Only certain types of sensor will permit this configuration.

Figure 17:
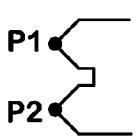
FIG. 17 shows that two separate sensors comprising apparatus 10 can be connected to a control system or comparator system using two wires with the sensors connected in series.

FIG. 17 shows that two separate sensors can be connected to a control system or comparator system using two wires with the sensors connected in series. Only certain types of sensor will permit this configuration.

FIG. 18 shows that two separate sensors can be connected to a control system or comparator system using two wires or three wires with the sensors connected in series. In this configuration one of the sensors has a changeover contact to permit this configuration.

Note that in all of the FIGS. 10 through 18 the connections from sensors and the comparator circuits may be located remotely from the apparatus 10 in separate control system locations or may be mounted within the apparatus 10 to permit local control.

As described above, the method and apparatus of the present invention provide a number of advantages, some of which have been described above and others of which are inherent in the invention. Also, modifications may be proposed without departing from the teachings herein. Accordingly, the scope of the invention is only to be limited as necessitated by the accompanying claims.

The invention claimed is:

1. A method of moving belt misalignment sensing using apparatus engaged to any suitably functional circuitry for same, the apparatus comprising at least a rear contact portion, a forward contact portion mounted to said rear contact portion, and wiring from each contact portion engaged to any suitable sensor for sensing changes in temperature in the contact portions, the method comprising the steps of:

placing the belt misalignment sensing apparatus at a position relative to the moving belt such that misalignment of the belt first places the forward contact portion in mechanical communication with a moving belt to generate a first sensed temperature level;

comparing the first sensed temperature level to a predetermined threshold temperature levels for the forward contact portion;

determining, based upon the step of comparing said measured temperature level to the predetermined threshold temperature level, whether the conveyor belt is misaligned, the misalignment being indicated when the first sensed temperature level exceeds the predetermined threshold temperature level for the forward contact portion.

2. The method of claim 1 further including the steps of:
comparing a second sensed temperature level when the rear contact portion is placed in mechanical communication with the moving belt when it has worn through the first forward portion to a second predetermined threshold temperature level for the rear contact portion;
determining, based upon the step of comparing said measured temperature level to the predetermined threshold temperature level, whether the conveyor belt is at a greater degree of misalignment, the greater misalignment being indicated when the second sensed temperature level exceeds the predetermined threshold temperature level for the rearward contact portion and further determining the amount of wear on the belt misalignment sensing apparatus itself.

3. The method of claim 1 wherein an indication is provided when the first sensed temperature level exceeds the predetermined threshold temperature level for the forward contact portion to indicate belt misalignment.

4. The method of claim 2 wherein an indication is provided when the second sensed temperature level exceeds the second predetermined threshold temperature level for the rearward contact portion to indicate the apparatus is worn out.

5. A method of moving belt misalignment sensing using apparatus engaged to any suitably functional circuitry for same, the apparatus comprising at least a rear contact portion, a forward contact portion mounted to said rear contact portion, and wiring from each contact portion engaged to any suitable sensor for sensing changes in temperature in the contact portions, the method comprising the steps of:
placing the belt misalignment sensing apparatus at a position relative to the moving belt such that misalignment of the belt first produces mechanical communication between the forward contact portion of the moving belt to generate a first sensed temperature level and next places the rear contact portion in mechanical communication with the moving belt when the moving belt has worn through the first forward contact portion;
sensing a first measured temperature level from the forward contact portion and a second measured temperature level from the rear contact portion;
comparing the first and second measured temperature levels to each other; and
determining, based upon the step of comparing said measured temperature levels to each other, whether the conveyor belt is misaligned if the first sensed temperature is higher than the second sensed temperature.

6. The method of claim 5 wherein it is further determined, based upon the comparing step, if the belt misalignment sensing apparatus is worn out if the second sensed temperature is higher than the first sensed temperature.

7. A method of moving belt misalignment sensing using apparatus engaged to any suitably functional circuitry for same, the apparatus comprising at least a rear contact portion, a forward contact portion mounted to said rear contact portion, and wiring from each contact portion engaged to any suitable sensor for sensing changes in temperature in the contact portions, the method comprising the steps of:
at a position relative to the moving belt such that misalignment of the belt first produces mechanical communication between the forward contact portion and the moving belt to generate a first sensed temperature level and next places the rear contact portion in mechanical communication with the moving belt when the moving belt has worn through the first forward contact portion to generate a second sensed temperature level;
comparing the first measured temperature level to a predetermined threshold temperature level;
determining, based upon the step of comparing the first measured temperature level to the predetermined threshold temperature level, whether the conveyor belt is misaligned as indicated by the first measured temperature level exceeding the predetermined threshold temperature level.

8. The method of claim 7 further including the steps of:
comparing the second measured temperature level to the first measured temperature level; and
determining, based upon the comparing step, wear out status of the belt misalignment sensing apparatus when the second measured temperature level exceeds the first measured temperature level.

9. A method of moving belt misalignment sensing using apparatus engaged to any suitably functional circuitry for same, the apparatus comprising at least a rear contact portion, a forward contact portion mounted to said rear contact portion, and wiring from each contact portion engaged to any suitable sensor for sensing changes in temperature in the contact portions, the method comprising the steps of:
placing the belt misalignment sensing apparatus at a position relative to the moving belt such that misalignment of the belt first produces mechanical communication between the forward contact portion of the moving belt to generate a first sensed temperature level and next places the rear contact portion in mechanical communication with the moving belt when the moving belt has worn through the first forward contact portion;
sensing a first measured temperature level from the forward contact portion and a second measured temperature level from the rear contact portion;
comparing the first and second measured temperature levels to each other;
determining, based upon the step of comparing said measured temperature levels to each other, whether the conveyor belt is misaligned if the first sensed temperature is higher than the second sensed temperature; and
eliminating any potential errors from changes of ambient temperature.

10. A method of moving belt misalignment sensing using apparatus engaged to any suitably functional circuitry for same, the apparatus comprising at least a rear contact portion, a forward contact portion mounted to said rear contact portion, and wiring from each contact portion engaged to any suitable sensor for sensing changes in temperature in the contact portions, the method comprising the steps of:
placing the belt misalignment sensing apparatus at a position relative to the moving belt such that misalignment of the belt first produces mechanical communication between the forward contact portion of the moving belt to generate a first sensed temperature level and next places the rear contact portion in mechanical communication with the moving belt when the moving belt has worn through the first forward contact portion;
sensing a first measured temperature level from the forward contact portion and a second sensed temperature level from the rear contact portion;

comparing the first and second sensed temperature levels to each other;
determining, based upon the step of comparing said sensed temperature levels to each other, whether the conveyor belt is misaligned if the first sensed temperature is higher than the second sensed temperature;
comparing the second sensed temperature level to a second predetermined threshold temperature level; and
determining, based upon the step of comparing the second sensed temperature level to a second predetermined threshold temperature level whether the apparatus is worn out.

11. A belt misalignment sensing apparatus for use in a system for indicating moving belt misalignment, the sensing apparatus comprising a mounting base, a rear contact portion mounted to said base, a forward contact portion mounted to said rear contact portion, and wiring from each contact portion engaged to any suitable sensor for sensing changes in temperature in the contact portions, the apparatus being mounted to conveyor framework in a position along a flight of a conveyor belt and being spaced from the belt such that, when a misalignment of the belt occurs, the belt first rubs against the forward contact portion and then against the second contact portion should the misalignment become more severe and rub through the first contact portion, the sensor to which each contact portion is engaged indicating temperature changes based on degree of misalignment.

12. The apparatus of claim 11 further being configured to sense wear out of itself.

13. The apparatus of claim 11 wherein the rear contact portion and the front contact portions comprise plates of any suitable thermal material which are insulated from one another and from the mounting base.

14. The apparatus of claim 11 wherein wiring from the second contact portion exits rearwardly from the apparatus through an opening therefore in the mounting base in a manner to be insulated from the base portion.

15. The apparatus of claim 11 wherein wiring from the first contact portion passes in an insulated manner through an opening in the second contact portion and exits rearwardly from the apparatus through an opening therefore in the mounting base in a manner to be insulated from the base portion.

16. The apparatus of claim 11 wherein the wiring from each contact portion is functionally engaged to a suitable sensor.

17. The apparatus of claim 11 wherein each suitable sensor is functionally engageable to any suitable comparator circuitry.

18. A belt misalignment sensing apparatus for use in a system for indicating moving belt misalignment, the sensing apparatus comprising at least a rear contact portion, a forward contact portion mounted to said rear contact portion, and wiring from each contact portion engaged to any suitable sensor for sensing changes in temperature in the contact portions, the apparatus being functionally mounted to conveyor framework such that, when a misalignment of the belt occurs, the belt first rubs against the forward contact portion and then against the second contact portion should the misalignment become more severe and rub through the first contact portion, the sensor to which each contact portion is engaged indicating temperature changes based on degree of misalignment.

19. The apparatus of claim 11 wherein the rear contact portion and the front contact portions comprise plates of any suitable thermal material which are insulated from one another and from any supporting surface.

* * * * *